(12) United States Patent
Sandy

(10) Patent No.: US 7,460,633 B2
(45) Date of Patent: Dec. 2, 2008

(54) FOLDING PORTABLE ELECTRONIC DEVICE WITH STORAGE COMPARTMENT

(75) Inventor: Bonni Shevin Sandy, Morton Grove, IL (US)

(73) Assignee: Dard Products, Inc., Evanston, IL (US)

( * ) Notice: Subject to any disclaimer, the term of this patent is extended or adjusted under 35 U.S.C. 154(b) by 121 days.

(21) Appl. No.: 11/673,475

(22) Filed: Feb. 9, 2007

(65) Prior Publication Data

US 2008/0025456 A1 Jan. 31, 2008

(51) Int. Cl.
G01C 21/00 (2006.01)

(52) U.S. Cl. .................. 377/24.2; 702/160; 235/105

(58) Field of Classification Search .............. 377/24.2; 702/160; 235/105; 482/3
See application file for complete search history.

(56) References Cited

U.S. PATENT DOCUMENTS

| 5,556,003 A | * | 9/1996 | Johnson et al. | ............... 222/39 |
| 5,839,461 A | * | 11/1998 | Lambeth, Jr. | ............... 135/72 |
| 7,023,422 B2 | * | 4/2006 | Haraguchi | ............... 345/156 |
| 2008/0030942 A1 | * | 2/2008 | Elizalde | ............... 361/683 |

* cited by examiner

Primary Examiner—Tuan T Lam
(74) Attorney, Agent, or Firm—Kenneth H. Ohriner; Perkins Coie LLP

(57) ABSTRACT

A pedometer or other portable electronic device may include substantially triangular first and second sections hinged together along a diagonal. A storage compartment is provided in one or both of the sections. The storage compartment may be accessed when the first section is pivoted open relative to the second section. A belt or pocket clip may be provided on the back of the first or second section. If used, the clip may extend in a direction substantially parallel to the hinge. A display, and control switches are provided for interaction with the electronic device.

20 Claims, 4 Drawing Sheets

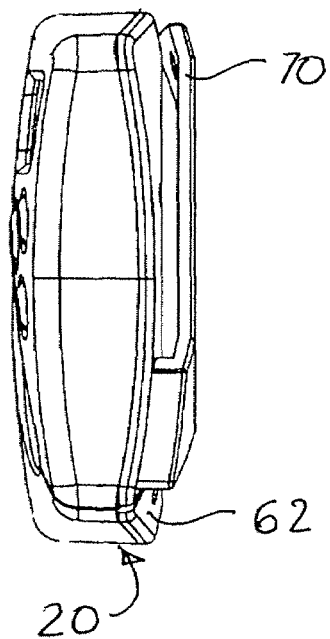
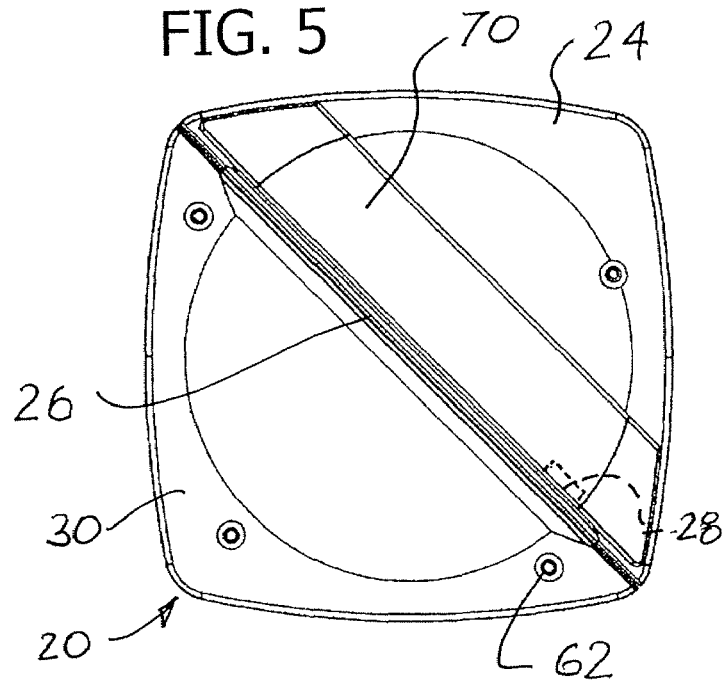
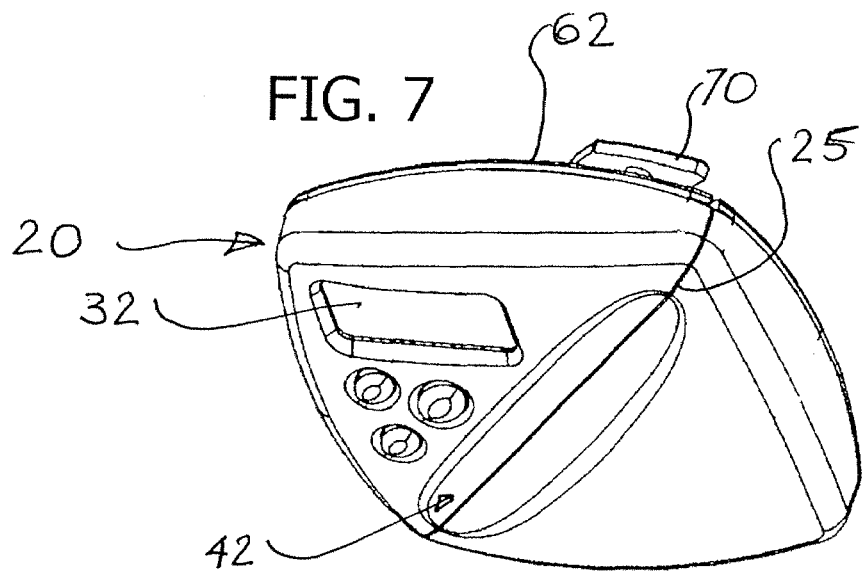

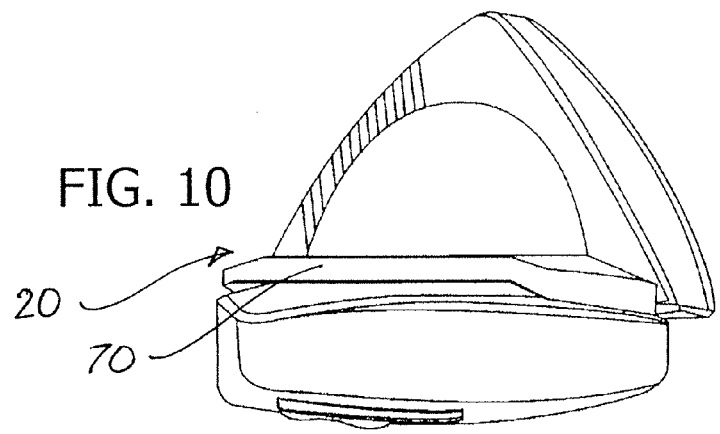
FIG. 10
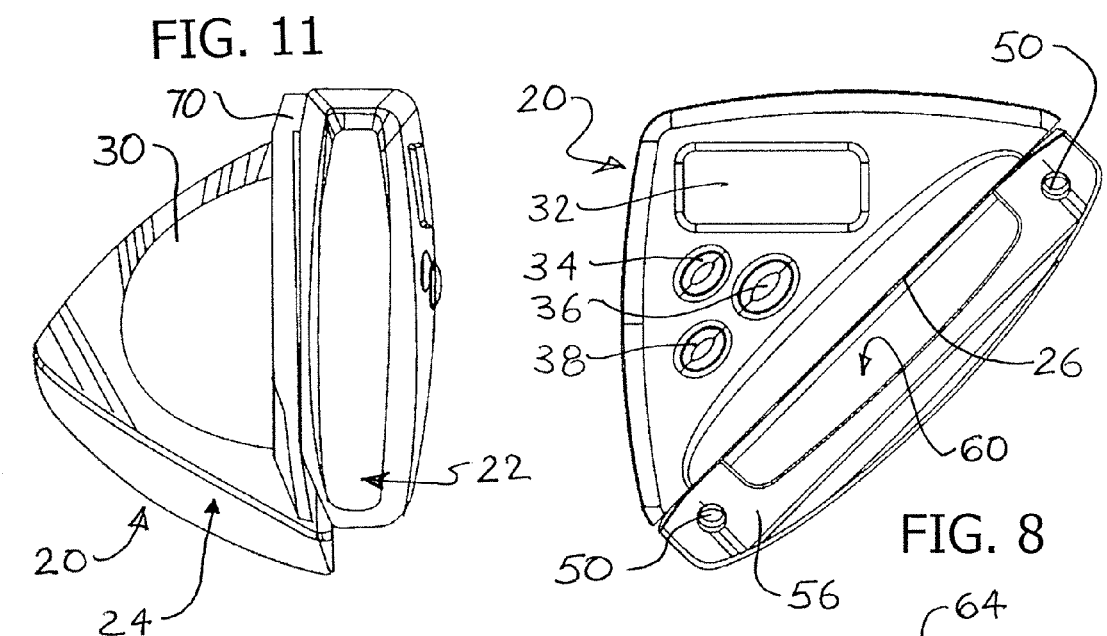
FIG. 11
FIG. 8
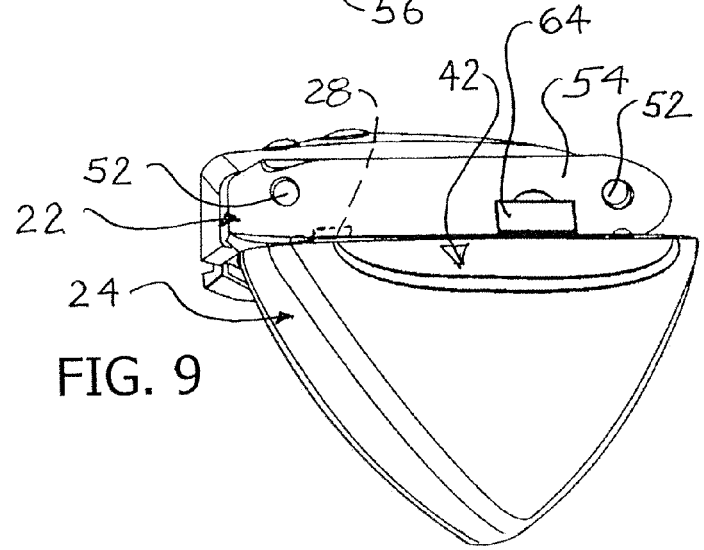
FIG. 9

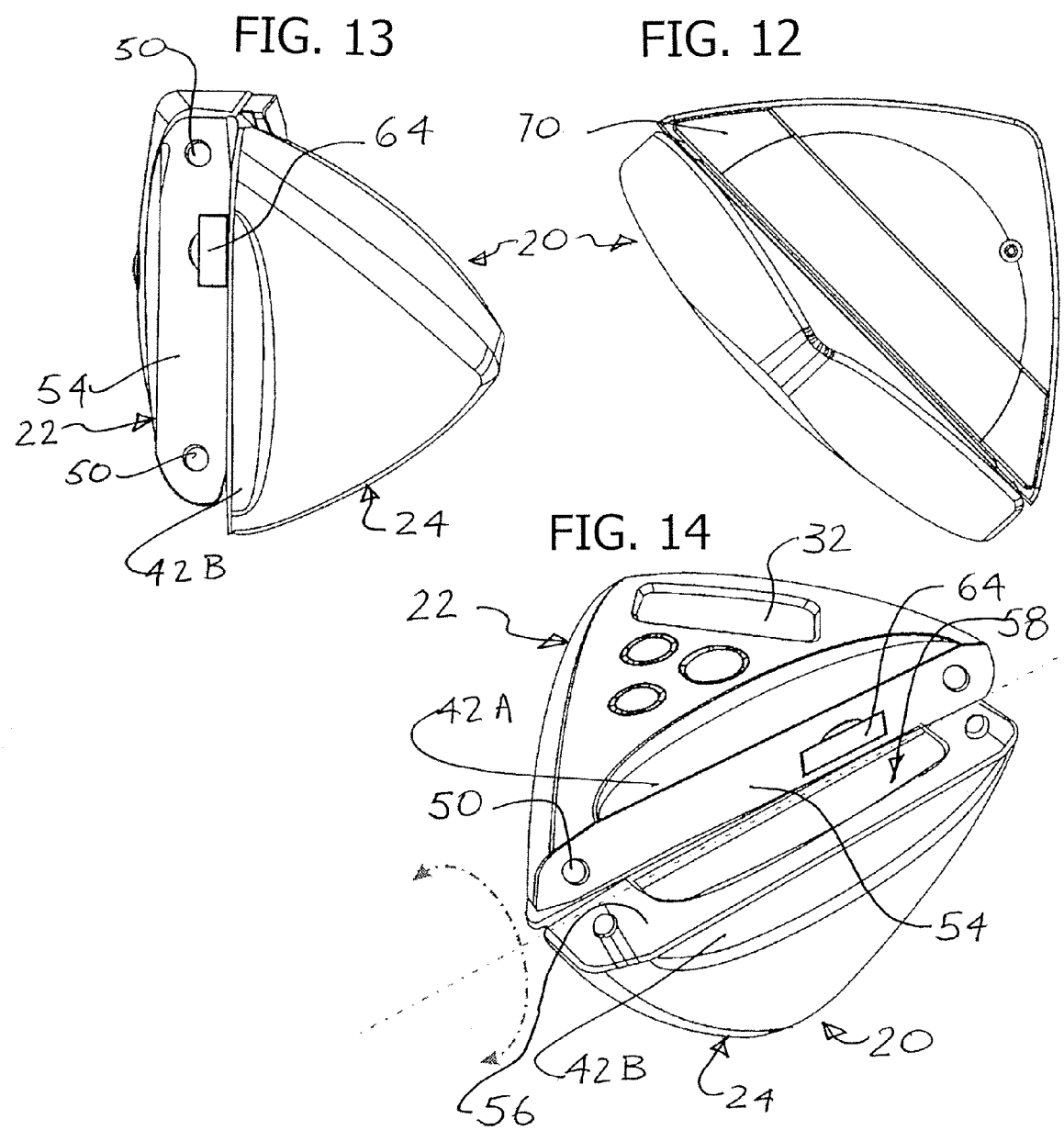

FOLDING PORTABLE ELECTRONIC DEVICE WITH STORAGE COMPARTMENT

BACKGROUND

Walking is increasingly a common and popular form of exercise. Various types of pedometers have been used by walkers to measure the distance walked. Generally, pedometers operate by detecting a walker's movement. Each shift in the walker's body position, which occurs with each step taken, is detected and counted by the pedometer. By counting steps or paces taken, a walker can then determine distance walked. Alternatively, paces counted on any given walk segment, day, or path, can be used for comparison purposes, instead of for determining an absolute distance covered. In either case, the ability to measure the distance allows the walker to compare distances walked at different times and places, to better comply with a walking regimen or program, or determine whether distance goals have been achieved. Measuring distance covered by walking (or running) can also provide an incentive to the walker, as well as help the walker or runner select an appropriate pace.

Many walkers prefer to carry few if any items with them. Items such as cell phones, keys, coins, etc. can be uncomfortable to carry while walking. When such items are carried in a pocket, the repeated movement of the items with each step can become annoying. On the other hand, as a practical necessity, most walkers want or need to carry some small items with them. For example, most walkers need to carry a house key with them. Many walkers may also want to carry a small amount of cash or coins. Walkers having certain medical conditions may also want to carry pills or similar pharmaceutical forms with them. On the other hand, carrying these types of small items while walking may be inconvenient. However, if the walker is wearing a pedometer, this inconvenience may be minimized or eliminated with a new pedometer design.

SUMMARY

This summary is included to provide a brief overview of the invention. However, the features and advantages described here are not requirements or limitations on the invention, and should not be taken as such. Rather, the limitations of the invention are set forth in the claims.

A pedometer or other portable electronic device may include substantially triangular first and second sections hinged together along a diagonal. A storage compartment is provided in one or both of the sections. The storage compartment may be accessed when the first section is pivoted open relative to the second section. In the pedometer embodiment, a clip may be provided on the back of the first or second section. If used, the clip may extend in a direction substantially parallel to the hinge. The pedometer embodiment will generally also have a pedometer device, a display, and control switches.

Other objects and advantages will appear in the following detailed description, wherein a single embodiment is disclosed and described. It should be understood, however, that the following detailed description and drawings are designed for the purpose of illustration and description only, and are not intended as a definition of the limits of the invention.

BRIEF DESCRIPTION OF THE DRAWINGS

In the drawings, wherein the same element number indicates the same element in each of the views:

In FIGS. 1-7, the pedometer is shown in the closed position.

FIG. 1 is a front view of a novel pedometer according to an embodiment of the invention.

FIG. 2 is a bottom view of the pedometer shown in FIG. 1.

FIG. 3 is a top view of the pedometer shown in FIGS. 1 and 2.

FIG. 4 is a left side view.

FIG. 5 is a back view.

FIG. 6 is a right side view.

FIG. 7 is a perspective view.

In FIGS. 8-14, the pedometer is shown in the open position.

FIG. 8 is a front view of the pedometer in the open position.

FIG. 9 is a bottom view of the pedometer shown in FIG. 8.

FIG. 10 is a top view of the pedometer shown in FIGS. 8 and 9.

FIG. 11 is a left side view.

FIG. 12 is a back view.

FIG. 13 is a right side view.

FIG. 14 is a perspective view.

DETAILED DESCRIPTION OF THE DRAWINGS

As used here, substantially the same length means within 5, 10 or 20% of the length of each other. Substantially square means that the sides are substantially the same length and that the sides are straight or curved. Substantially parallel means extending in a direction that is parallel or within 10 degrees or less of parallel. Substantially coplanar means in the same plane, or in planes offset by 3-5 mm or less.

The following detailed description is provided with respect to an embodiment set up for use as a pedometer. However, the invention includes other electronic devices as well, which may be unrelated. For example, the elements described may be set up for a clock, a stopwatch, a counter, a global positioning unit, a cell phone, an email appliance, and various other portable battery powered devices having a display and control switches linked to circuitry.

Figure 3:
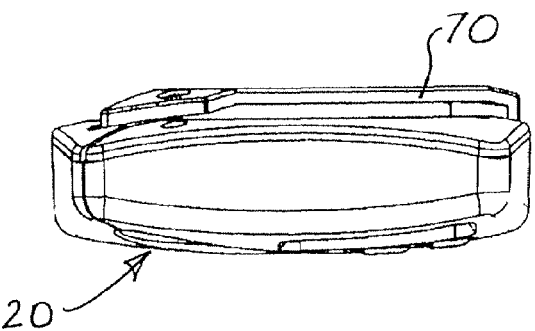
Figure 4:
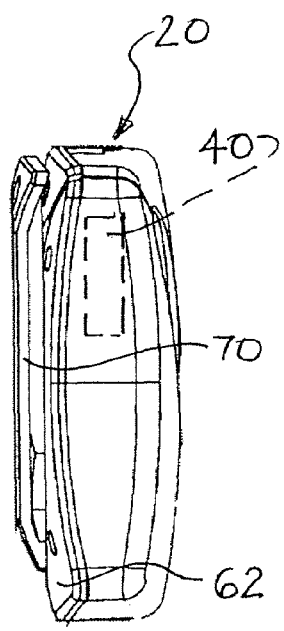
Figure 1:
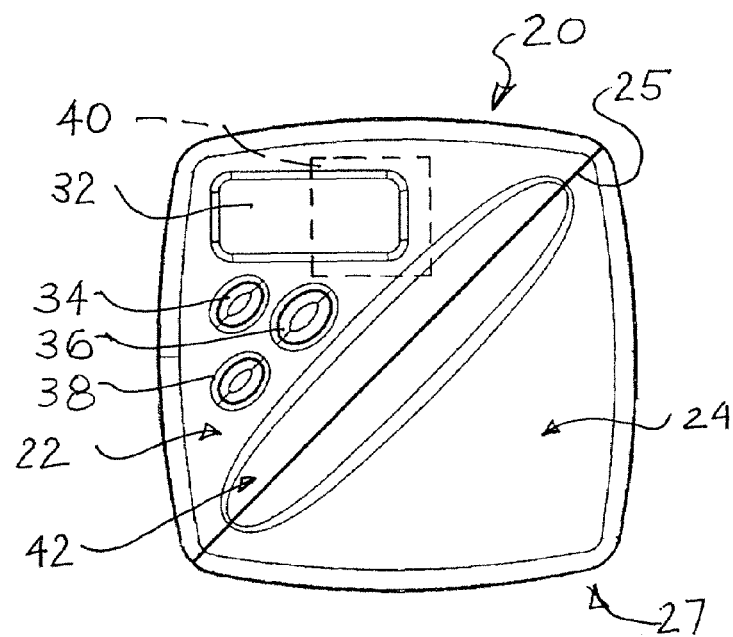
Figure 2:
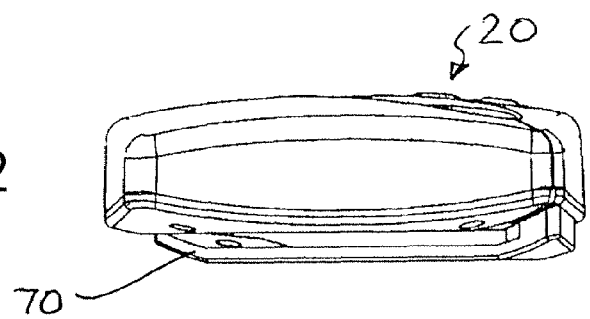

As shown in FIGS. 1 and 5, a pedometer 20 has a first section 22 pivotally attached to a second section 24 via a hinge 26. In the design shown, the first and second sections are substantially triangular, specifically in a form similar to a right triangle. With the longest side of each section adjacent to each other, as shown in FIG. 1, a separation line 25 is shown in FIG. 1. The separation line 25 may be parallel and aligned over the hinge 26. Alternatively, the hinge may be slightly offset to one side of the separation line. In either case, the separation line 25 and the hinge are located substantially on the diagonal of the square or rectangular housing 27 formed by the first and second sections 22 and 24.

The housing 27 is moveable from the closed position shown in FIGS. 1-7 to the open position shown in FIGS. 8-14, with nominal bending force. Each of the first and second sections 22 and 24 has a top wall and a bottom wall joined to first and second side walls, and diagonal walls 54 and 56, respectively. The diagonal walls 54 and 56 are visible when the housing is in the open position, as specifically shown in FIG. 14. The bottom wall of each of the first and second section may be separate parts, or they may be formed from a single bottom plate 30, shown in FIGS. 5 and 11. If used, the single bottom plate 30 may be attached to the first and second sections 22 and 24 using screws or rivets 62 as shown in FIG. 5. The bottom plate 30 may also have a score or flex line along the diagonal, to act as a hinge. A separate hinge element 26 is then not needed. Regardless of the form of hinge used, a detent 28 shown in dotted lines in FIGS. 5 and 9, may optionally be included to hold the housing into the open or closed position. Alternatively, another friction or holding element may be used. For example, a hinge 26 having a relatively high friction resistance may be used, so that the hinge itself provides holding force.

As shown in FIG. 1, for a pedometer embodiment, a display 32 and control switches or buttons 32, 34, and 36 may be provided on the top wall of the first section 22. A pedometer assembly 40 is then linked to these elements and contained within the first section. Referring momentarily to FIG. 14, one or more batteries may be installed into the pedometer 20 by opening a battery door 64 on the diagonal wall 54. Of course, circuitry providing other functions may be used with, or instead of, the pedometer elements. As shown in FIGS. 1, 7, and 14, a recess 42 may be formed around the separation line 25, with half of the recess 42A formed on the top wall of the first section 22 and the other half of the recess 42B formed on the top wall of the second section 24.

Turning to FIGS. 8-14, alignment pins 50 may be provided on the diagonal wall 54, for engagement into holes or receptacles 52 on the diagonal wall 56. As the walls 52 and 54 are brought together when the pedometer 20 is moved into the closed position, the pins engage the holes 52. This tends to cause the first and second sections 22 and 24 to shift slightly as needed, so that they are better aligned with each other. As shown in FIG. 14, an opening 58 in the diagonal wall 56 leads into a storage compartment 60 in the second section. Since the opening 58 is effectively closed off by the diagonal wall 54 when the pedometer is closed, a separate door to cover the opening 58 is not needed. The opening 58 is typically about 2-8 or 4-6 cm. Accordingly, small items such as keys, pills, etc. may be inserted through the opening and into the storage compartment.

As shown in FIGS. 2-6 and 10-12, a clip 70, such as belt or pocket clip, is advantageously attached onto the bottom of the pedometer 20. Specifically, the clip is positioned to one side of the hinge 26 and is aligned substantially parallel to the hinge 26 or to the separation line 25. Although the hinge 26 is shown on the bottom wall of the second section 24, it may optionally be located on the first section as well. Similarly, the pedometer elements 32, 34, 36, 38, and 64, and the storage compartment 60, may be located in either the first or the second section. In the design shown, by locating all of the pedometer elements in the first section, the storage compartment 60 in the second section 24 can be made larger.

In an everyday typical use, the user pivots the pedometer 20 (or other form of the device) into the open position best shown in FIG. 14. This movement is performed by grasping each of the sections with the hands and bending or folding them about the separation line 25. The hinge element, and detent, if any, allow this movement with only nominal force. If a detent is used, the pedometer may tend to pop open after moving past a predetermined angle. The user then places small items to be carried into the storage compartment 60. The pedometer 20 is then closed. In the closed position the diagonal wall 54 closes off the opening 58. This prevents any item from inadvertently falling out of the compartment 60. The pedometer may then be clipped onto the user's belt, pant waist, or pocket. The user controls the pedometer or other functions via the switches 34, 36, and/or 38. To retrieve the items, the steps above are reversed.

Thus, a novel combination portable electronic device and storage compartment have been shown and described. Various changes and substitutions may of course be made without departing from the spirit and scope of the invention. The invention, therefore, should not be limited, except by the following claims and their equivalents.

The invention claimed is:

1. A pedometer comprising:
 a first section;
 a second section pivotally attached to the first section;
 a pedometer device in the first section; and
 a storage compartment in the second section.

2. The pedometer of claim 1 with the first section having first, second, and third sides, with the first side substantially oriented at right angle to the second side, and with the third side longer than either of the first side and the second side, and with the second section having fourth, fifth, and sixth sides, with the fourth side substantially oriented at right angle to the fifth side, and with the sixth side longer than either of the fourth side and the fifth side, and with third side of the first section attached to the sixth side of the second section with a hinge element.

3. The pedometer of claim 2 with the third side and the sixth side having substantially the same length.

4. The pedometer of claim 2 with the first side and the fourth sides having substantially the same length.

5. The pedometer of claim 2 with the second side and the fifth side having substantially the same length.

6. The pedometer of claim 2 with the first, second, fourth and fifth sides having substantially the same length.

7. The pedometer of claim 1 further comprising a display and at least two control buttons on the first section.

8. The pedometer of claim 1 further comprising a belt clip on the second section.

9. The pedometer of claim 8 with the first and second sections substantially forming a square, and with the belt clip oriented along a diagonal of the square.

10. The pedometer of claim 1 with the first section attached to the section with a hinge element, and further comprising a belt clip on the first or second section, with the belt clip oriented substantially parallel to the hinge element.

11. A pedometer comprising:
 a substantially triangular first section having first, second, and third sides, with the third side longer than the first or second sides;
 a substantially triangular second section having fourth, fifth, and sixth sides, with the sixth side longer than the fourth or fifth sides;
 a hinge pivotally attaching the third side of the first section to the sixth side of the second section, to form a substantially square housing foldable along a diagonal;
 a clip on the housing, with the clip extending in a direction substantially parallel to the hinge;
 a pedometer device in the housing;
 a display on the housing;
 two or more control switches on the housing; and
 a storage compartment in the housing, with access to the storage compartment provided by pivoting the first section into an open position relative to the second section.

12. The pedometer of claim 11 further comprising a detent associated with the hinge, for holding the first section into an open position or into a closed position relative to the second section.

13. The pedometer of claim 11 further comprising a friction element acting between the first and second sections.

14. The pedometer of claim 13 with the friction element comprising the hinge.

15. The pedometer of claim 11 further comprising a first elongated recess on a top side of the first section, with the first elongated recess oriented substantially parallel to the hinge, and a second elongated recess on a top side of the second section, with the second elongated recess also oriented substantially parallel to the hinge, and with the second elongated recess substantially aligned with the first elongated recess, when the housing is in the closed position.

16. The pedometer of claim 11 further comprising a first diagonal wall at the third side of the first section and a second diagonal wall at the sixth side of the second section, with an opening in the second diagonal wall leading into the storage compartment.

17. The pedometer of claim 11 with the housing moveable from a closed position, where the first section is substantially parallel and coplanar with the second section, to an open position where the first section is substantially perpendicular to the second section.

18. An object comprising:
- a first section having a first side wall, a second side wall, and a first diagonal wall each joined to a first top wall and a first bottom wall, with the first diagonal wall longer than the first or second side walls;
- a second section having a fourth side wall, a fifth side wall and a second diagonal wall each joined to a second top wall and second bottom wall with the second diagonal wall longer than the fourth or fifth side walls, and with the first and second diagonal side walls substantially parallel to each other and having substantially the same length;
- a hinge pivotally attaching the first section to the second section, with the hinge substantially parallel to the first and second diagonal walls;
- an elongate clip on the second bottom wall of the second section, with the elongate clip substantially parallel to the second diagonal wall;
- a pedometer device in the first or second section;
- a display on the first or second section;
- two or more control switches on first or second section; and
- a storage compartment in the first or second section, with access to the storage compartment provided by pivoting the first section into an open position relative to the second section.

19. The object of claim 18 with the first section moveable from a closed position, where the first section is substantially parallel and coplanar with the second section, to an open position where the first section is substantially perpendicular to the second section.

20. The object of claim 18 with the first top wall substantially coplanar with the second top wall, and with the first bottom wall substantially coplanar with the second bottom wall, when the first section is in a closed position relative to the second section.

* * * * *